United States Patent
Souchard et al.

(10) Patent No.: US 6,475,939 B1
(45) Date of Patent: Nov. 5, 2002

(54) PORCELAIN ENAMEL FOR ALUMINIZED STEEL

(75) Inventors: Thierry Souchard, Moeslains (FR); Alain Aronica, Saint Dizier (FR)

(73) Assignee: Ferro France - S.A.R.L., Saint Dizier (FR)

( * ) Notice: Subject to any disclaimer, the term of this patent is extended or adjusted under 35 U.S.C. 154(b) by 0 days.

(21) Appl. No.: 09/646,151

(22) PCT Filed: Feb. 26, 1999

(86) PCT No.: PCT/EP99/01387

§ 371 (c)(1),
(2), (4) Date: Nov. 22, 2000

(87) PCT Pub. No.: WO99/54262

PCT Pub. Date: Oct. 28, 1999

(30) Foreign Application Priority Data

Apr. 17, 1998 (EP) .............................................. 98107049

(51) Int. Cl.⁷ .............................. C03C 8/00; C03C 8/14
(52) U.S. Cl. ........................................... 501/14; 501/17
(58) Field of Search ...................................... 501/17, 14

(56) References Cited

U.S. PATENT DOCUMENTS

| 2,911,312 A | 11/1959 | Hoffman | 106/48 |
|---|---|---|---|
| 2,925,351 A | 2/1960 | Judd | 106/48 |
| 2,930,713 A | 3/1960 | Hoffman | 117/70 |
| 2,975,070 A | 3/1961 | Bricker et al. | 106/49 |
| 2,986,530 A | 5/1961 | Hoffman | 252/301.6 |
| 3,061,449 A | 10/1962 | Hoffman | 106/49 |
| 3,383,225 A | 5/1968 | Stradley | 106/48 |
| 4,469,798 A | 9/1984 | Nishino et al. | 501/14 |
| 4,732,794 A | 3/1988 | Hyde | 428/210 |
| 5,266,357 A | 11/1993 | Preuss et al. | 427/376.5 |
| 5,650,364 A | 7/1997 | Munstedt et al. | 501/21 |

FOREIGN PATENT DOCUMENTS

| CH | 414073 | 5/1966 |
|---|---|---|
| EP | 0402007 | 12/1990 |
| EP | 0453897 | 10/1991 |
| EP | 0950644 | 10/1999 |
| FR | 2134417 | 8/1972 |
| FR | 2565224 | 12/1985 |
| GB | 1330185 | 9/1973 |
| JP | 6191040 | 9/1986 |

Primary Examiner—Christopher A. Fiorilla
(74) Attorney, Agent, or Firm—Rankin, Hill, Porter & Clark LLP

(57) ABSTRACT

The present invention provides a composition for use in forming an adherent, brilliant white, chemically and mechanically resistant porcelain enamel coating on aluminized steel. The composition includes a self-opacifying glass frit component which includes high levels of titanium dioxide, lithium oxide, sodium oxide, and potassium oxide. The composition is able to produce a brilliant white finish on aluminized steel in one coat without the addition of titanium oxide during milling.

3 Claims, No Drawings

PORCELAIN ENAMEL FOR ALUMINIZED STEEL

This application is a 371 of PCT/EP99/01387 filed Feb. 20, 1999.

FIELD OF INVENTION

The present invention concerns chemical compositions for use in forming porcelain enamel coatings on aluminized steel. More particularly, the present invention concerns compositions for use in forming adherent, brilliant white, chemically and mechanically resistant, porcelain enamel coatings on aluminized steel.

BACKGROUND OF INVENTION

Aluminized steel is widely used in automotive, appliance, building material, cookware, and other applications where rust resistance is required. In many of these applications, it is highly desirable to apply an adherent, bright white, chemically and mechanically resistant, porcelain enamel coating to the aluminized steel.

There are many conventional white porcelain enamel compositions known in the art for use on steel. However, these conventional porcelain enamel compositions, which are typically fired in 780° to 950° C. range, are not suitable for use on aluminized steel because they mature at temperatures exceeding the melting point of aluminum (660° C.).

In an effort to apply porcelain enamel coatings to aluminized steel, resort was made in the past to special enamels which had been developed for use on aluminum and alloys of aluminum. However, use of these special enamels, which could be fired in the 530° to 570° C. range, was not particularly successful due in part to incompatible thermal expansion properties as between the special enamels and the aluminized steel. The linear coefficient of thermal expansion of aluminum, for which these special enamels were developed, is nearly twice that of aluminized steel.

Examples of prior art patents include U.S. Pat. No. 3,061,449, issued to Hoffman, which discloses a porcelain enamel composition for use on aluminized steel which contains significant levels of PbO. Although this enamel composition exhibited compatible thermal expansion properties for use on aluminized steel, it did not produce light colored opaque enamel surfaces. Pigments or other coloring agents had to be added to the composition according to Hoffman during milling in order to achieve a light color. It is generally desirable to achieve opacity in an enamel by having the glass frit component form opaque crystals on firing (self-opacifying), rather than by adding pigments or other coloring agents to the enamel system during milling, because self-opacifying enamels generally have superior luster, hiding power, and whiteness properties.

U.S. Pat. No. 5,266,357, issued to Preuss et al., discloses a process whereby a porcelain enamel coating can be applied to aluminized steel by: (I) applying an enamel slip composition containing a low-temperature enamel frit (passing into glass flux at less than 600° C.), a mill addition of high-melting inorganic oxidic powder, and a mill addition of copper or iron oxides; (II) drying the slip coating; and (III) firing at temperatures in the 8000 to 850° C. range. Although enamels applied to aluminized steel according to this process displayed improved adhesion and resistance properties as compared to the art at the time, light colored opaque enamel surfaces could not be produced by this process, thus requiring an additional second application or top coat of a white enamel composition in order to achieve a light colored enamel surface.

Accordingly, a composition is needed for use in forming an adherent, brilliant white, chemically and mechanically resistant porcelain enamel coating on aluminized steel. Such a composition should include a self-opacifying glass component, and should avoid use of toxic materials such as, for example, PbO, and should be able to be applied in only one coating layer.

SUMMARY OF INVENTION

The present invention is directed to a chemical composition for use in forming an adherent, brilliant white, chemically and mechanically resistant, porcelain enamel coating on aluminized steel. The composition according to the present invention includes a novel glass component and optional mill additions. The glass component includes by weight of from about 20 to about 40% $SiO_2$, from about 20 to about 40% $TiO_2$, from about 8 to about 20% $Na_2O$, from about 0 to about 20% $B_2O_3$, from about 2 to about 15% $K_2O$, from about 1 to about 11% $Li_2O$, from about 0 to about 8% $Sb_2O_3$, from about 0 to about 5% $P_2O_5$, from about 0 to about 4% BaO, from about 0 to about 3% MgO, and from about 0 to about 3% $Al_2O_3$. The glass component may comprise one or more glass frits so as to provide the overall stated composition. The glass component is capable of self-opacifying on firing at temperatures well below the melting point of aluminum.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION

The novel enamel composition of the present invention is particularly well-suited for use on aluminized steel such as that typically used in automotive, appliance, sanitary ware, building material, cookware, and other applications where rust resistance is required. Other uses will be apparent to those skilled in the art.

The novel porcelain enamel composition of the present invention preferably comprises from about 85% to about 100% by weight of the glass component. The glass component of the enamel composition may comprise one or more glass frits. Preferably, the glass component provides a composition as follows:

| Oxide | Weight % | More Preferred Weight % |
|---|---|---|
| $SiO_2$ | 20–40 | 27–33 |
| $TiO_2$ | 20–40 | 25–31 |
| $Na_2O$ | 8–20 | 10–15 |
| $B_2O_3$ | 0–20 | 8–15 |
| $K_2O$ | 2–15 | 5–12 |
| $Li_2O$ | 1–11 | 4–8 |
| $Sb_2O_3$ | 0–8 | 2–6 |
| $P_2O_5$ | 0–5 | 0–3 |
| BaO | 0–4 | 0–3 |
| MgO | 0–3 | 0–2 |
| $Al_2O_3$ | 0–3 | 0–2 |
| SrO | 0–3 | 0–2 |
| $MoO_3$ | 0–3 | 0–2 |
| ZnO | 0–3 | 0–2 |

-continued

| Oxide | Weight % | More Preferred Weight % |
|---|---|---|
| SnO | 0–3 | 0–2 |
| $V_2O_5$ | 0–10 | 0–5 |

The glass frit or frits that comprise the glass component may be prepared utilizing conventional glass melting techniques. A conventional ceramic refractory, fused silica, or platinum crucible may be used to prepare the glass frit. Typically, selected oxides are smelted at around 1250° C. for 30 minutes. The molten glass formed in the crucible is then converted to glass frit using water-cooled rollers and milling equipment. It will be appreciated that the step of producing the glass frit is not per se critical and any of the various techniques well-known to those skilled in the art can be employed.

The enamel composition according to the present invention is suitable for application to an aluminized steel substrate using conventional techniques such as, for example, either wet or dry application processes. Suitable wet application processes include wet spraying, wet electrostatic application, dipping and flow coating, which are well-known, and electrophoretic application. The disclosures of U.S. Pat. Nos. 5,002,903, 4,085,021 and 3,841,986 are incorporated herein by reference for their teachings relative to the electrophoretic application of porcelain enamel coating compositions. Dry application processes, such as for example a standard corona charging gun, are also well-known. The disclosures of U.S. Pat. Nos. 4,110,487 and 3,928,668 are hereby incorporated by reference for their teachings relative to the dry or electrostatic application of porcelain enamel coating compositions. When employing a wet application or technique, it is generally preferred that the aluminized steel be degreased prior to the application of the enamel.

It will be appreciated that the glass frit component may be used in combination with various mill additions. It will also be appreciated that the mill additions will vary depending upon the specific application conditions being utilized. For dry applications, the glass component may be used in combination with one or more conventional organopolysiloxanes. Such organopolysiloxanes are commonly employed in enamel compositions that are designed for dry application. For wet application processes, the glass frits may be milled in conjunction with other mill additions such as sodium molybdate, molybdenum trioxide (molybdic acid hydride/ammonium polymolybdate), sodium silicate, quartz, bentonite, etc. to produce a suitable composition. Also, it will be appreciated that depending upon the particular application one or more pigments or coloring agents may be included in the enamel composition. As is well-known in the art, there is a wide range of other acceptable mill agents or components that may also be utilized in the present invention to produce the desired resultant product. However, it will be appreciated that the use of certain additions may have an undesirable effect on the properties of the resultant enamel. Generally, it is best to avoid additions that contain any form of chlorine.

The resultant product preferably provides a coarseness of 1% by weight through a 325 mesh sieve (45 microns). However, it will be appreciated the milling fineness may be altered to meet the requirements of the specific application process being utilized or the desired final properties of the enamel.

Whether applied by wet or by dry processes, the coating composition of the present invention may be applied at a rate of from about 250 to about 450 grams per square meter so as to provide a coating thickness of from about 2 to about 8 mils subsequent to firing. The coating thickness is not critical, and can be varied based upon the particular application or need or opacity required.

Articles that have been coated with the coating composition of the present invention may be fired in a conventional manner using conventional firing equipment. Firing is generally conducted in an air convection furnace at a temperature of from about 560° C. to about 600° C. for a period of from about 6 to about 15 minutes. However, it will be appreciated that depending upon the specific application and composition of the glass component, a longer or shorter firing period could be used.

It will be appreciated that products coated with enamel compositions made in accordance with the present invention have a brilliant white opaque finish. The fired appearance of the final coating is smooth and uniform and substantially free of ripples or curtaining. Additionally, the enamel coatings made in accordance with the present invention are color stable, resistant to chemical attack (acid resistance), and display good mechanical resistance properties. Further, it will be appreciated that the enamels of the present invention may also be used on aluminum, of course, the thermal expansion of the enamel system may need adjustment to form a suitable bond on aluminum.

The following examples are intended only to illustrate the invention and should not be construed as imposing limitations upon the claims:

EXAMPLE I

Glass frits A, B and C, having the following compositions, were prepared using conventional glass melting techniques:

| | Weight Percent | | |
|---|---|---|---|
| Oxide | A | B | C |
| $SiO_2$ | 29.68 | 29.61 | 26.47 |
| $TiO_2$ | 27.72 | 27.64 | 27.89 |
| $Na_2O$ | 11.12 | 11.10 | 15.25 |
| $B_2O_3$ | 13.44 | 13.41 | 11.75 |
| $K_2O$ | 8.22 | 8.19 | 7.00 |
| $LiO_2$ | 4.93 | 5.47 | 5.86 |
| $Sb_2O_3$ | 2.94 | 2.93 | 3.30 |
| $P_2O_5$ | 0.00 | 0.00 | 2.48 |
| BaO | 1.10 | 0.00 | 0.00 |
| MgO | 0.85 | 0.85 | 0.00 |
| $Al_2O_3$ | 0.00 | 0.80 | 0.00 |

EXAMPLE II

Porcelain enamel coating compositions were prepared using the glass frits A, B and C of Example I to provide compositions I, II and III. In each case, the components as shown below were ground in a ball mill in a conventional manner to provide a coarseness of 1% by weight through a 325 mesh sieve (45 microns).

| Component | Weight Percent | | |
|---|---|---|---|
| | I | II | III |
| Frit A | 100 | — | — |
| Frit B | — | 100 | — |
| Frit C | — | — | 100 |
| Sodium molybdate | 0.5 | 0.5 | — |
| Molybdenum trioxide | 1 | 1 | — |
| Sodium silicate | 2.5 | 2.5 | — |
| Water (ml. per 100 g. frit) | 45 | 45 | — |
| Methylhydrogenpolysiloxane) | — | — | 0.2 |
| Dimethylpolysiloxane) | — | — | 0.03 |

The resulting coating compositions I and II were applied to aluminized steel plates using a conventional wet spray coating technique at a rate of 350 grams per square meter and then dried. The resulting coating composition III was applied to an aluminized steel plat using a conventional dry application technique (standard corona discharge gun at 70 Kv) also at a rate of 350 grams per square meter. Each of the three enamel coated aluminized steel plates were then fired in an air convection furnace at 580° C. for 12 minutes. In all three cases, an adherent, crystallized, brilliant white, chemically and mechanically resistant, porcelain enamel finish was obtained.

While the invention has been explained in relation to its preferred embodiments, it is to be understood that various modifications thereof will become apparent to those skilled in the art upon reading this specification. Therefore, it is understood that the invention disclosed herein is intended to cover such modification as fall within the scope of the appended claims.

What is claimed:

1. A porcelain enamel coating composition for use on aluminized steel comprising:

a glass frit component comprising by weight
from about 27% to about 33% $SiO_2$,
from about 25% to about 31% $TiO_2$,
from about 10% to about 15% $Na_2O$,
from about 8% to about 15% $B_2O_3$,
from about 5% to about 12% $K_2O$,
from about 4% to about 8% $Li_2O$,
from about 2% to about 6% $Sb_2O_3$,
from about 0% to about 50% $P_2O_5$,
from about 0% to about 3% BaO,
from about 0% to about 2% MgO, and
from about 0% to about 2% $Al_2O_3$.

2. A porcelain enamel coating composition as in claim 1 wherein said glass frit component comprises from about 85% to about 100% of said composition by weight, and wherein said composition further comprises up to about 15% by weight of mill additions.

3. A porcelain enamel coating composition as in claim 2 wherein said mill additions comprise at least one material selected from the group consisting of sodium molybdate, molybdenum trioxide, sodium silicate, and organopolysiloxane.

* * * * *